Sept. 14, 1937.　　A. Y. DODGE ET AL　　2,093,236
TRANSMISSION
Filed May 19, 1934　　5 Sheets-Sheet 1

INVENTOR.
Adiel Y. Dodge
Victor W. Kliesrath
BY
ATTORNEY

Sept. 14, 1937.   A. Y. DODGE ET AL   2,093,236

TRANSMISSION

Filed May 19, 1934   5 Sheets-Sheet 5

INVENTOR.
Adiel Y Dodge
Victor W. Kliesrath
BY
ATTORNEY

Patented Sept. 14, 1937

2,093,236

UNITED STATES PATENT OFFICE 2,093,236

TRANSMISSION

Adiel Y. Dodge and Victor W. Kliesrath, South Bend, Ind.; said Kliesrath assignor to The Steel Wheel Corporation, Chicago, Ill., a corporation of New York Application May 19, 1934, Serial No. 726,522

18 Claims. (Cl. 74—293)

This invention relates to vehicle driving mechanism, and is illustrated as embodied in an automobile having either a front drive or a rear-mounted engine, i. e. in which the power plant is arranged between and drivably connected to two of the road wheels.

An important object of the invention is to provide a vehicle of this type with an automatic transmission, preferably of the infinitely-variable type. In one desirable arrangement, the transmission mechanism is segregated into two units, preferably arranged on opposite sides of the differential, with the engine arranged to drive elements of both of these units and with a speed and torque varying connection between other elements of the two units, and with a driving connection between the differential and the driven element of one of the units. An auxiliary feature of the invention relates to varying these connections, when desired, to give a reverse drive without the use of extra parts.

This arrangement makes the drive very compact, and especially well adapted for use in the restricted space ahead of the engine of a front-drive car or ahead of a rear-mounted engine, locations impossible with the bulky automatic transmissions heretofore designed. This location is also facilitated by arranging the transmission in two units separated by the differential. With this arrangement particularly in mind, we will describe herein several arrangements in which a torque-amplifying speed-reducing unit arranged between the engine and the differential is connected, by means shown as extending through a hollow worm driving the differential, to a planetary or other gearing ahead of and drivably connected to the differential hollow worm.

Where such a planetary gearing is to be used, we prefer to connect the engine both to the driving element of the torque-amplifying unit and to the sun gear of the planetary gearing, and to connect the driven element of the torque-amplifying transmission to another element of the planetary gearing, for example by a driving sleeve or hollow shaft through which there may pass a shaft connecting the engine to the sun gear as described above. Thus the engine drives two elements of the planetary gearing, one directly and the other through the torque-amplifying unit, while the third or driven element of the planetary gearing is connected to the hollow worm or other driving element of the differential.

Three types of torque-amplifying units are illustrated, viz.: (1) a hydraulic unit, (2) a centrifugal impulse unit, and (3) a toroidal friction-drive unit. The first two of these are shown in forms adapted to be arranged, as described below, to give substantially direct drive in "high" gear. They are also preferably provided with one-way clutches or equivalent means preventing (in forward drive) retrograde movement of the planetary element driven by the torque-amplifying unit, thus giving a positive geared drive at forward low speed, this being especially desirable because at these low speeds the illustrated types of torque-amplifying units are not fully efficient. The friction drive unit is preferably arranged to give an "overdrive" or greater than one-to-one ratio in "high".

It will be seen that in normal forward operation there is a positive definite geared low speed, followed by an automatic infinitely-varied intermediate speed, and with substantially direct drive in "high", the variation between "low" and "high" being secured by controlling one of two parallel paths of power flow or drive from the engine to the differential, giving what may be called a series-multiple drive.

Other features relate to securing a reverse drive by changes in the above-described connections, without any added mechanism, to providing a positive definite low-speed geared drive for use in descending hills so that the engine may be used as a brake, and to various novel combinations of parts and desirable particular constructions which will be apparent from the following description of the illustrative embodiment shown in the accompanying drawings, in which:

Figures 10, 11, 12:
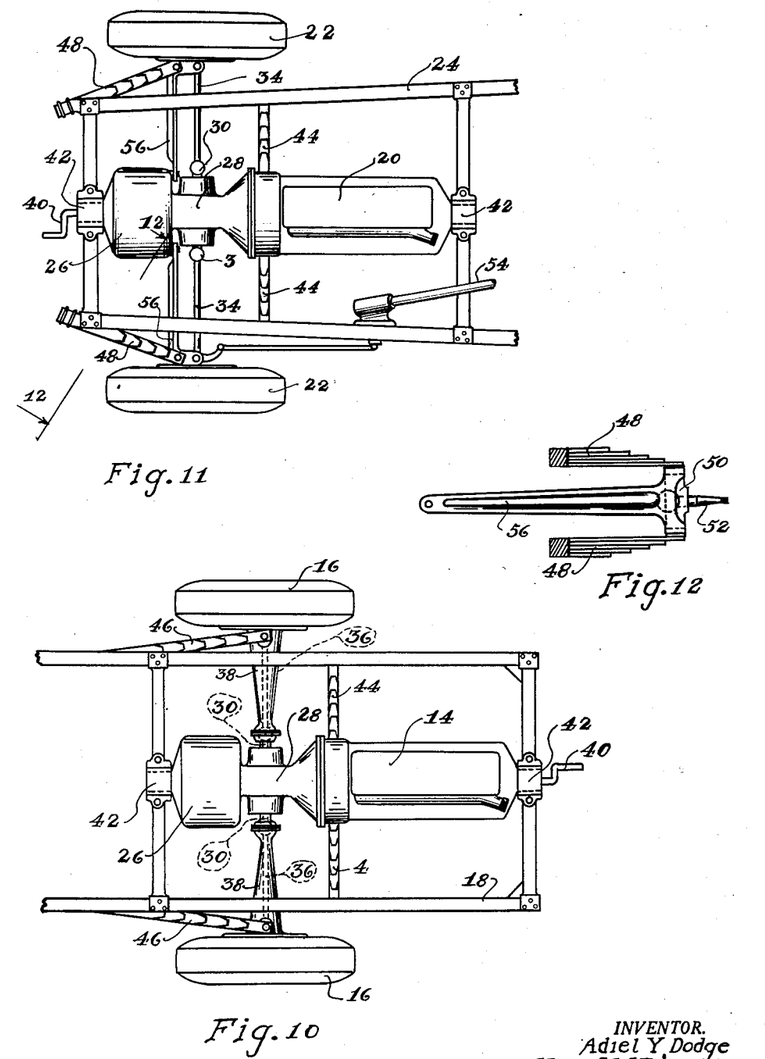
Figure 10 is a top plan view of the rear end of an automobile chassis having a rear-mounted engine driving the rear wheels through one of our novel transmissions.
Figure 11 is a top plan view of the front end of a front-drive automobile embodying our invention.
Figure 12 is a partial section on the line 12—12 of Figure 11, showing the individual springing of the wheels.

Referring first to Figures 10, 11, and 12, our novel drive mechanism is intended for use with a rear-mounted engine 14 (Figure 10) driving the rear road wheels 16 of a chassis having a frame or other support 18, or a front-mounted engine 20 (Figure 11) driving the front wheels 22 of a chassis having a frame or other support 24.

In both cases the power plant including the engine 14 or 20 is arranged between the wheels which it drives, and in both cases the power plant preferably includes (rigidly bolted to the engine to form a rigid power plant unit) one of the combination differential-transmission drive units described below, and illustrated in Figures 10 and 11 as including an engine driven transmission 26 driving a differential 28 having at its sides driven axle shafts 30 universally jointed to shafts 34 or 36 driving (and universally jointed to) the road wheels. The shafts may if desired be inclosed in suitable housings 38 (Figure 10).

In Figure 11 the hand crank 40 is ahead of the transmission 26, in Figure 10 it is behind the engine 14; in both cases the differential-transmission drive unit is ahead of the engine, with shafts 30 alined with the wheel axes.

The power plant may be pivotally supported on the vehicle as described in application No. 651,821, filed January 14, 1933, by Victor W. Kliesrath, and is illustrated as having alined front and rear bosses journaled pivotally in bearings 42, pivotal movement thereof being restrained by means illustrated diagrammatically as leaf springs 44 engaging the sides of the power plant and the side members of the frame 18 or 24.

In the arrangement of Figure 10, the wheels are journaled in any desired manner on supports carried by the outer ends of the housings 38, the load being transmitted to the wheels by pairs of upper and lower quarter-elliptic springs 46 secured at their bases or forward ends to the frame 18 and diverging therefrom, with the outer and more flexible ends secured to the housings 38.

In the arrangement of Figures 11 and 12, similar pairs of quarter-elliptic springs 48 are secured at their bases or forward ends to the frame 24 and diverge rearwardly therefrom, with the more flexible rear ends swiveled to the upper and lower ends of knuckles 50 formed with bearings rotatably supporting spindles 52 universally jointed to the shafts 34, and on which are secured the front wheels 22. The wheels are swivelled by any suitable steering gear 54. Radius rods 56, pivoted at both ends, may if desired be provided to insure the correct positioning of the wheels relatively to the differential.

Having in mind the above arrangements in which it is intended for use, hydraulic and centrifugal-impulse and toroidal friction embodiments of my invention will be described; obviously, however, many of the advantages of the invention may be attained with transmissions of other types.

The invention is specifically intended for use with the transmissions described in application No. 723,083 filed April 30, 1934, by Adiel Y. Dodge, and illustrated in a desirable arrangement in Figures 1 to 5 hereof inclusive. In these figures the novel drive mechanism is inclosed in a novel housing, (preferably made in one piece) having a central part 60 inclosing the differential driving the shafts 30, a rear part 62 rigidly bolted to the engine, and a front part 64 formed with a cylindrical boss 66 adapted to be mounted in one of the bearings 42. The novel transmission mechanism is preferably segregated into two units arranged respectively in casing parts 62 and 64.

Figures 1, 2:
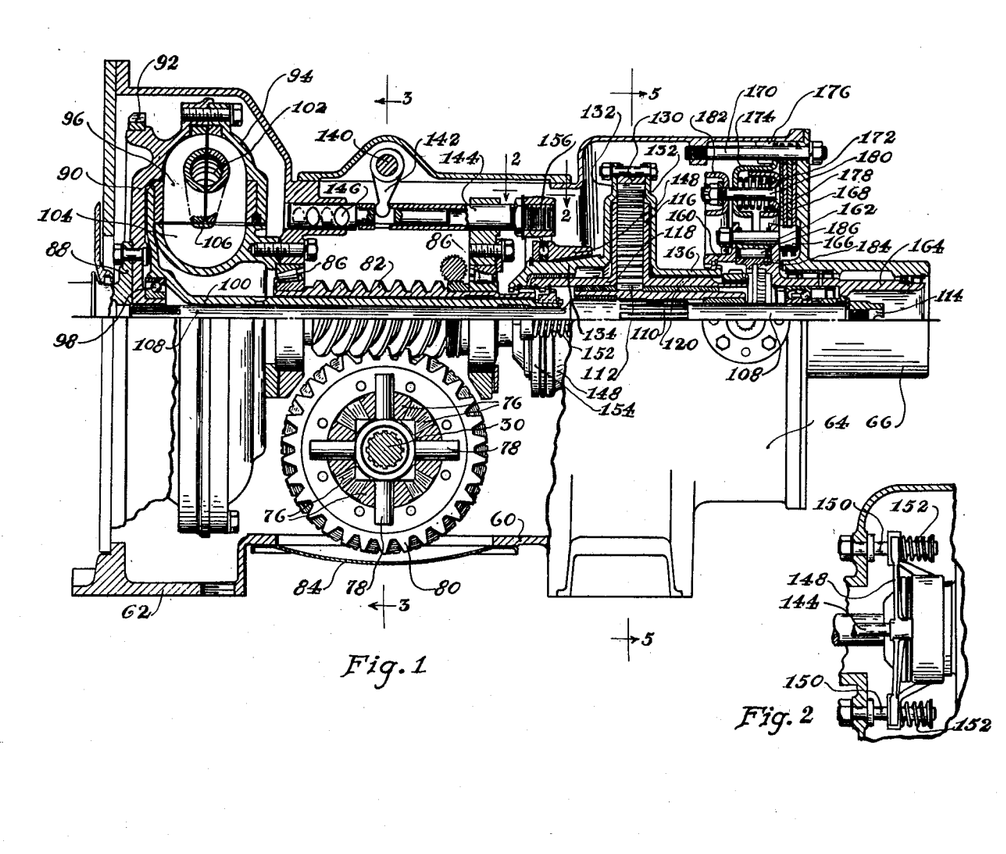
Figure 1 is a section through a novel drive unit intended to be bolted or otherwise secured to the front of an engine, in longitudinal central section above the center line, and with the transmission casing broken away below the center line to show some of the parts in side elevation.
Figure 2 is a partial section on the line 2—2 of Figure 1, showing part of the shifting means to secure forward drive, neutral, and reverse.

The illustrated differential includes side gears 68 splined to the shafts 30 and supported by plain bearings 70 seated in sleeves formed on the differential spider unit. These sleeves in turn are held by ball bearings 71 locked in place by threaded sleeves 72 which carry ball bearings 74 rotatably supporting the shafts 30. The side gears 68 mesh with differential pinions 76 mounted on the pivots of a spider 78 carried by the differential spider unit, which unit is peripherally secured to a driven worm gear 80 meshing with a hollow worm 82. The differential housing may have a removable lower cap 84 to facilitate access to the differential gears. The worm 82 which drives the differential is journaled at its ends in roller or other bearings 86 carried by webs formed transversely of the differential housing.

The engine crankshaft terminates, in the illustrated arrangement, in a flange 88 bolted to a flywheel 90 having the usual starter ring gear 92. In the embodiment of Figure 1, the flywheel 90 has bolted thereto a vaned impeller 94 forming part of a three-element torque-amplifying hydraulic torque-converter unit more fully described in the above-identified Dodge application.

Opposite the impeller 94 is a vaned rotor or driven member 96 mounted on a ball bearing 98 carried by the flywheel 90, and continued as a driven sleeve 100 extending through the hollow worm 82. The vanes of the impelled 94 and the rotor 96 carry the two halves of a toroidal core 102.

Within the vanes of the impeller and rotor is arranged a vaned stator or reaction member 104 bolted to the housing 60. The vanes of the stator 104 and of the impeller 94 and of the rotor 96 carry three rings 106 forming an inner or secondary core.

In the operation of the above-described torque converter, liquid is driven outwardly by the vanes of the impeller 94, against the vanes of the rotor 96. At low speeds this liquid then passes below the core 106 between the vanes of the stator 104, by which it is then directed upwardly again into the impeller 94.

At high speeds, approximating a one-to-one drive, the liquid passes between the cores 102 and 106 directly from the rotor 96 to the impeller 94, and the device operates as a two-element fluid flywheel instead of as a three-element torque converter. The stator 104 at such high speeds is ineffective.

The flywheel (i. e. the engine) not only drives the above-described hydraulic torque converter, but is also splined to the end of a drive shaft 108 passing through the sleeve 100 and having an enlarged portion formed with splines 110 by which it is keyed to a sun gear 112 forming part of a novel planetary gearing unit arranged on the opposite side of the differential from the torque converter. The other end of the shaft 108 has the usual jaw clutch 114 to engage the hand crank 40.

Figures 3, 4, 5:
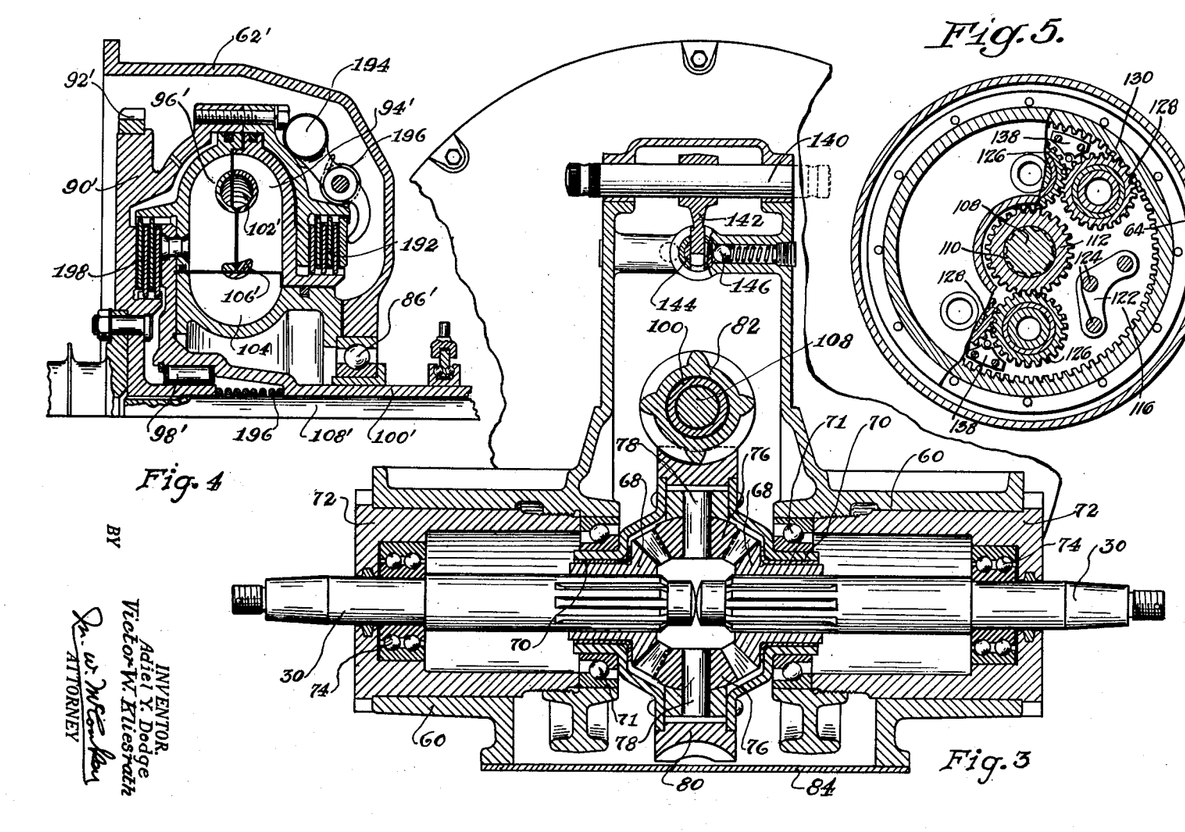
Figure 3 is a transverse section on the line 3—3 of Figure 1.
Figure 4 is a partial section corresponding to the upper lefthand corner of Figure 1, but showing a different form of hydraulic unit.
Figure 5 is a transverse section generally on the line 5—5 of Figure 1, showing the planetary gearing, with the planet carrier in elevation on one side and broken away to show the planet pinions on the other side.

The novel planetary unit includes a pinion gear carrier 116, including end plates having sleeves 118 and 120 and connected by spacers 122 and bolts 124 (Figure 5). Between the end plates of the gear carrier 116 are mounted pairs of intermeshing planetary pinions 126 and 128, the inner pinion 126 of each pair meshing with the engine-driven sun gear 112 and the outer pinion 128 of each pair meshing with a ring gear 130 secured by bolts or the like to a ring gear carrier comprising end plates 132 having central sleeves 134 and 136 journaled respectively on the sleeves 118 and 120.

If desired, blocks 138 may be placed between the pinions to cause them to act as gear pumps circulating lubricant to the various parts of the transmission.

The above-described planetary gear is shiftable as a unit axially upon the shaft 108. In the arrangement shown, a driver-operated transverse rockshaft 140 has a shifter arm 142 engaging and axially shifting a shifter rod 144 which may have the usual spring-ball and notch positioning means diagrammatically indicated at 146.

The end of the axially-shiftable rod 144 carries a head 148 slidably mounted (Figure 2) on opposite studs 150, shown provided with springs 152 urging the head 148 toward the left. As best shown in Figure 1, the head 148 can be manipulated to shift the planetary unit toward the left by acting through a ball thrust bearing 156 on a stop ring 154 carried by the sleeve 134 of the ring-gear carrier, or to shift it to the right by direct engagement of its conical inner surface with a corresponding conical surface formed on the sleeve 134.

The conical surfaces insure synchronism of the parts before engagement of the clutches referred to below. The positioning device 146 normally cooperates with springs 152 to hold the two conical surfaces spaced slightly apart.

It will be noted that the ends of the worm 82 and the sleeve 100 have tooth or jaw clutches adapted to be brought, by the shifting of the planetary unit, into mesh with cooperating clutches on the ends of the sleeves 134 and 118. The other sleeves 136 and 120 also have clutches engaged by such shifting with three other clutches described below.

The first of these three clutches in on a ring 160 secured to a race 162 and a sleeve 164 by means such as bolts 166 on which are slidably keyed disks forming part of a disk brake 168 the other disks of which are keyed on bolts 170 which secure the end of the housing in place. The disks of the brake 168 are urged together by springs 172 compressed between an annular channel-section stamping 174 seated against a ledge 176 on the housing, and another stamping 178 engaging one of the non-rotatable brake disks.

The stamping 178 may be connected by means such as bolts 180 to a ring 182 mounted to be operated by a clutch pedal or the like to throw out the above-described brake. It will be seen that normally the brake holds the ring 160, with its dog clutch, stationary.

The second of the three dog clutches is formed on an inner race 184 connected to the race 162 by a one-way roller clutch 186. Thus this dog clutch is normally prevented from turning in one direction, but can turn freely in the other direction.

The third of the three dog clutches is formed on the sleeve 164, and is therefore normally stationary.

The shifting of the planetary unit, by engaging the above-described clutches in different ways, gives the following effective positions, beginning with the planetary unit at the extreme left:

1. *Reverse.*—In this position, the sleeve 118 is clutched to the worm 82, and the sleeve 136 is clutched to the stationary ring 160.

2. *Neutral.*—All the dog clutches are disengaged.

3. *Normal forward.*—The sleeve 134 is clutched to the worm 82, the sleeve 118 to the sleeve 100, and the sleeve 120 to the ring or race 184 which is held against reverse rotation but can turn forward.

4. *Positive low-gear forward.*—The sleeve 134 is still clutched to the worm 82, but the sleeve 120 is clutched to the stationary sleeve 164, and the sleeve 118 is disconnected from the sleeve 100.

In the operation of the transmission with the ports in Position #3 described above, the engine drives both the impeller 94 and the sun gear 112. At first (in starting from a standstill) the drive is entirely through the sun gear, as the impeller is turning too slowly to be effective while at the same time the one-way clutch 186 prevents reverse rotation of the gear carrier 116 and therefore also of the rotor 96 which is clutched through its sleeve 100 to the gear carrier. The drive at this time is substantially as if there was only the planetary unit present, and is a positive geared low-speed drive.

As the speed increases, a point is reached where the liquid from the impeller begins to turn the rotor 96 forwardly, as is permitted by the one-way clutch 186. Now the sun gear 112 and the rotor 96 are both driving, the former acting on the pinions 126 and the latter on the gear carrier 116, while the drive from the planetary unit is from the ring-gear carrier 132 to the worm 82. It will be noted that the ring gear 130 turns in the same direction as the shaft 108, on account of the arrangement of the pinions 126 and 128 in pairs.

As the speed increases, the liquid finally short-circuits between the cores 106 and 102, so that at high speed the stator 104 does not offer any drag. If desired, as explained below and in the above-mentioned Dodge application, at some predetermined speed (e. g. 45 miles per hour), if desired, the rotor and impeller may be clutched together, in which case all the hydraulic and planetary parts would turn together as a unit. However, in the particular arrangement illustrated in Figure 1, we intend to allow a slight slip (approximately 7%) between the impeller and rotor, to avoid the added complication of the speed-controlled clutch described below.

In Position #2 (neutral), the sun gear 112 merely turns the planetary gearing idly. The rotor 96 also turns idly, as it is not connected to any driven member.

In Position #1 (reverse), the hydraulic torque converter is idle, not being connected to any driven member, and the gear carrier 116 is the driven element of the planetary gearing and drives the worm 82 backward, the ring gear 130 being held stationary by the ring 160.

In Position #4, used for example in descending a steep hill, the hydraulic torque converter is idle and the drive is a positive forward planetary low-gear drive.

If it is desired to eliminate entirely the slip at high speed, an arrangement such as that shown in Figure 4 may be used. In this figure, parts corresponding to those above described are indicated by the same reference characters with added primes.

In this particular arrangement, the impeller 94' does not turn with the flywheel 90' at very low speeds, but is clutched thereto at a predetermined speed by a speed-controlled clutch illustrated as a disk clutch 192 controlled by centrifugal weights 194 acting against the resistance of torsion springs 196.

At approximately one-to-one rotation of impeller and rotor, the hydrostatic pressure of the liquid acting on the rotor 96' shifts it axially to the left, against the resistance of a spring 196, to cause the engagement of a disk clutch 198 which couples the flywheel 90' directly to the rotor 96' and its driven sleeve 100', to give a direct mechanical drive with no slippage.

Figure 6:
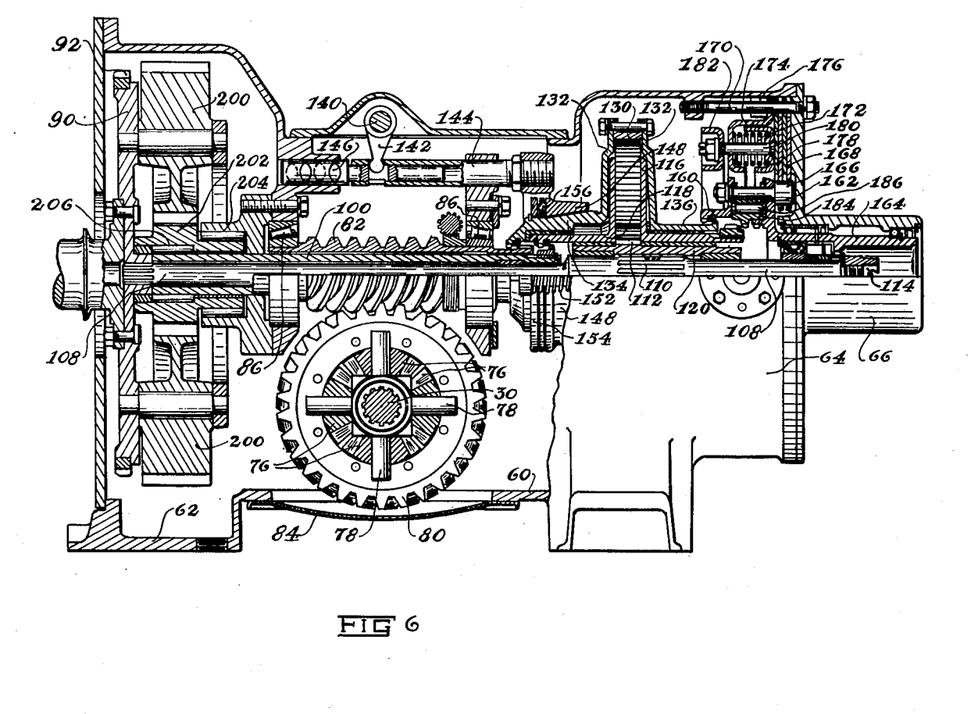
Figure 6 is a section corresponding generally to Figure 1, but showing a transmission in which the torque-amplifying unit is of the centrifugal impulse type.

Figure 6 shows our novel drive mechanism with a centrifugal impulse torque-amplifying device substituted for the hydraulic torque converter of Figure 1. In this arrangement, the flywheel 90 not only drives the shaft 108 as previously described, but also has pivoted thereon eccentrically-weighted pinions 200 meshing with a sun gear 202 held against reverse rotation by means such as a one-way roller brake 204, and arranged to operate on forward rotation to drive the sleeve 100 through another one-way roller clutch 206.

This transmission operates to amplify the driving torque according to the principles of centrifugal-impulse transmissions, but otherwise operates in the same manner as the transmission of Figure 1.

Figures 7, 8, 9:
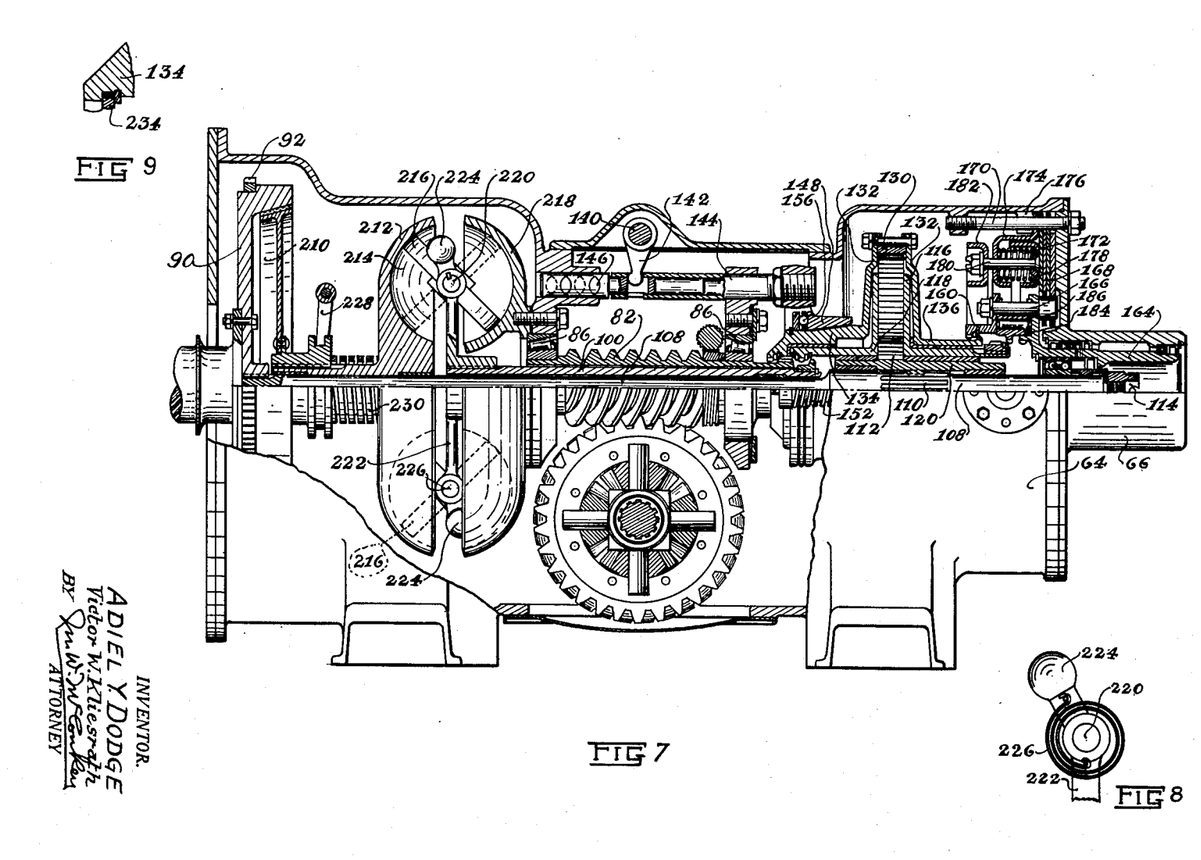
Figure 7 is a similar section through a transmission having a toroidal friction-drive torque-amplifying unit.
Figure 8 is a detail showing how a spring-resisted centrifugal weight may be utilized to shift the friction rollers in Figure 7.
Figure 9 is a detail on a larger scale than Figure 7 showing a part of one of the clutches.

Figure 7 illustrates the transmission with a toroidal friction drive substituted for the hydraulic torque converter. In this case the flywheel 90 drives, in addition to the shaft 108, through means such as a cone clutch 210 splined to its hub, a driving member 212 having a groove 214 semicircular in cross-section. The member 212 drives a plurality of friction rollers 216 which roll upon a stationary element 218 similar to the driving element 212.

The rollers 216 are pivoted in yokes swiveled upon pivots 220 carried by a driven spider 222 keyed to the driven sleeve 100 previously described. The yokes carrying the rollers 216 have centrifugal weights 224 acting against torsion springs 226 (Figure 8). Thus as the speed increases the rollers 216 are centrifugally swiveled from low-speed (dotted) position to high-speed (full-line) or overdrive position.

The clutch 210 is operable by means such as a clutch lever 228 acting against the resistance of a clutch spring 230 which also serves to urge together the friction wheels 212 and 218 and the rollers 216.

The operation of this transmission differs from that of Figure 1 in that the torque amplification is secured by the friction device described above instead of by the hydraulic torque converter.

Figure 9 shows how synchronization of the parts to be clutched together may be promoted by providing one part with a yieldable friction ring 234 which engages the clutch teeth on the other part before the two sets of clutch teeth intermesh.

While several illustrative embodiments have been described in detail, it is not our intention to limit the scope of the invention to those particular embodiments, or otherwise than by the terms of the appended claims.

We claim:

1. A vehicle drive unit comprising a differential rotatable about a transverse axis and having wheel-driving means at its opposite sides and having a driving worm gear, a hollow worm meshing with and driving said gear, a torque-amplifying unit arranged on one side of said differential and having a driven sleeve extending through the hollow worm, engine-driven means drivably connected to said unit and extending through said sleeve and having a sun gear on the other side of the differential from said unit, and a planetary gear on the other side of the differential from said unit having one part driven by said sun gear and another part driven by said sleeve and a third part driving said worm.

2. A vehicle having driven wheels and a differential rotatable about a transverse axis and having at its opposite sides means driving said wheels and having a driving worm gear, a hollow worm meshing with and driving said gear, a torque-amplifying unit arranged on one side of said differential and having a driven sleeve extending through the hollow worm, engine-driven means drivably connected to said unit and extending through said sleeve and having a sun gear on the other side of the differential from said unit, and a planetary gear on the other side of the differential from said unit having one part driven by said sun gear and another part driven by said sleeve and a third part driving said worm.

3. A vehicle drive unit comprising a differential rotatable about a transverse axis and having wheel-driving means at its opposite sides and having a driving worm gear, a hollow worm meshing with and driving said gear, a torque-amplifying unit arranged on one side of said differential and having a driven sleeve extending through the hollow worm, engine-driven means drivably connected to said unit and extending through said sleeve and having a sun gear on the other side of the differential from said unit, a planetary gear on the other side of the differential from said unit having one part driven by said sun gear and another part driven by said sleeve and a third part driving said worm, and means for changing the connections of said planetary gear to drive said worm in either direction to give forward and reverse drive.

4. A vehicle having driven wheels and a differential rotatable about a transverse axis and having at its opposite sides means driving said wheels and having a driving worm gear, a hollow worm meshing with and driving said gear, a torque-amplifying unit arranged on one side of said differential and having a driven sleeve extending through the hollow worm, engine-driven means drivably connected to said unit and extending through said sleeve and having a sun gear on the other side of the differential from said unit, a planetary gear on the other side of the differential from said unit having one part driven by said sun gear and another part driven by said sleeve and a third part driving said worm, and means for changing the connections of said planetary gear to drive said worm in either direction to give forward and reverse drive.

5. A vehicle drive unit comprising a differential having wheel-driving means at its sides, a torque-amplifying unit at one side of the differential, a planetary gear at the other side of the differential, engine driven means driving said unit and also driving one element of the planetary gear, a driving connection between another element of the planetary gear and the driven side of said unit, and a driving connection between said differential and an element of the planetary gear which is driven by both of said other elements.

6. A vehicle having road wheels and a differential between said wheels and having means at its sides drivably connecting it to the wheels, a torque-amplifying unit at one side of the differential, a planetary gear at the other side of the differential, engine driven means driving said unit and also driving one element of the planetary gear, a driving connection between another element of the planetary gear and the driven side of said unit, and a driving connection between said differential and an element of the planetary gear which is driven by both of said other elements.

7. A vehicle drive unit comprising a differential having wheel-driving means at its sides, a torque-amplifying unit at one side of the differential, a planetary gear at the other side of the differential, engine driven means driving said unit and also driving one element of the planetary gear, a driving connection between another element of the planetary gear and the driven side of said unit, a driving connection between said differential and an element of the planetary gear which is driven by both of said other elements, means for changing said driving connections to connect the differential selectively to one or another of the planetary gear elements to give either forward or reverse drive of said differential and means to hold one of the planetary gear elements stationary when said driving connections are changed to give reverse drive.

8. A vehicle having road wheels and a differential between said wheels and having means at its sides drivably connecting it to the wheels, a torque-amplifying unit at one side of the differential, a planetary gear at the other side of the differential, engine driven means driving said unit and also driving one element of the planetary gear, a driving connection between another element of the planetary gear and the driven side of said unit, a driving connection between said differential and an element of the planetary gear which is driven by both of said other elements, means for changing said driving connections to connect the differential selectively to one or another of the planetary gear elements to give either forward or reverse drive of said differential and means to hold one of the planetary gear elements stationary when said driving connections are changed to give reverse drive.

9. A vehicle drive comprising a wheel-driving differential, engine-driven means having a gear unit and an infinitely variable torque multiplying device on opposite sides of said differential, a connection between said gear unit and the differential for driving the differential in "low" at a definite and predetermined gear reduction, and a connection between said torque multiplying device and the gear unit to give automatically a torque-amplifying infinitely-variable intermediate speed drive and to give substantially a direct one-to-one drive in "high".

10. A vehicle drive comprising a wheel-driving differential, engine-driven means having a gear unit and an infinitely variable torque multiplying device on opposite sides of said differential, a connection between said gear unit and the differential for driving the differential in "low" at a definite and predetermined gear reduction, and a connection between said torque multiplying device and the gear unit to give automatically a torque-amplifying infinitely-variable speed above said definite "low" speed.

11. A vehicle drive comprising a wheel-driving differential, engine-driven means having a gear unit and an infinitely variable torque multiplying device on opposite sides of said differential, a connection between said gear unit and the differential for driving the differential at a definite and predetermined gear reduction in reverse, and a connection between said torque multiplying device and the gear unit to give automatically in forward drive a torque-amplifying infinitely-variable speed.

12. A vehicle drive comprising a wheel-driving differential, engine-driven means having a gear unit and an infinitely variable torque multiplying device on opposite sides of said differential, a connection between said gear unit and the differential for driving the differential in "low" at a definite and predetermined gear reduction, a connection between said torque multiplying device and the gear unit to give automatically a torque-amplifying infinitely-variable speed above said definite "low" speed, said connections comprising parts arranged to be shifted to give a reverse drive.

13. A vehicle drive comprising a wheel-driving differential, a hydraulic drive unit on one side of the differential, a gear unit on the other side of the differential, engine-driven means for driving elements of both units, a driving connection between other elements of said units, and a driving connection between one of said units and said differential.

14. A vehicle drive comprising a wheel-driving differential, a torque-amplifying impulse-type drive unit on one side of the differential, a gear unit on the other side of the differential, engine-driven means for driving elements of both units, a driving connection between other elements of said units, and a driving connection between one of said units and said differential.

15. A vehicle drive comprising a wheel-driving differential, a variable-speed friction-type drive unit on one side of the differential, a gear unit on the other side of the differential, engine-driven means for driving elements of both units, a driving connection between other elements of said units, and a driving connection between one of said units and said differential.

16. A vehicle drive comprising a wheel-driving differential driven by a hollow worm, and a torque-amplifying infinitely-variable transmission including a variable speed drive unit on one side of the differential and a gear unit on the other side of the differential driving said worm, said units having parts connected by means extending through said worm.

17. A vehicle drive comprising a wheel-driving differential driven by a hollow worm, a torque-amplifying infinitely variable transmission including transmission units on opposite sides of the differential, a connection from one of said units to the worm, a driving shaft extending through the worm and connected to both of said units, and a sleeve extending through the worm and surrounding the driving shaft and connected to parts of said units.

18. A vehicle drive comprising a wheel-driving differential driven by a hollow worm, a torque-multiplying infinitely variable transmission unit on one side of the differential and a gear unit on the other side of the differential, a sleeve extending through the worm and connecting the driven member of the transmission unit to one element of the gear unit, a driving shaft extending through the sleeve and connected to the driving member of the transmission unit and to another element of the gear unit, and means for connecting a third element of the gear unit to the worm.

ADIEL Y. DODGE.
VICTOR W. KLIESRATH.